United States Patent Office 2,974,060
Patented Mar. 7, 1961

2,974,060
FLUIDIZED BED COATING METHOD

Conrad J. Dettling, Reading, Pa., assignor to The Polymer Corporation, a corporation of Pennsylvania No Drawing. Filed July 18, 1958, Ser. No. 749,309

5 Claims. (Cl. 117—21)

The present invention, generally, relates to methods of producing protective coatings and, more particularly, to a method of producing such coatings on the surfaces of articles having sections of different heat capacity characteristics.

A simplified flow diagram of the process is as follows:

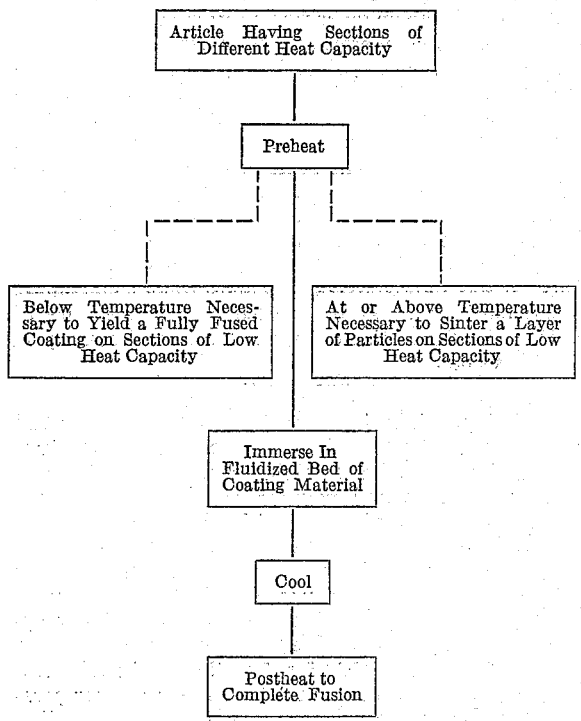

Coatings on metallic articles are particularly desirable for protection from destructive solvents, chemicals or corrosive agents, or when it is desired that the surfaces be electrically insulated or resistant to mechanical abrasion or frictional wear. Of course, articles to be coated may also be of nonmetallic materials such as glass, ceramics, wood and the like. Materials frequently used as protective coatings are the polymeric thermoplastic resins such as polyethylene and the linear polyamides, generally referred to as nylons.

According to the coating procedure described in the British Patent No. 759,214 for coating articles in a fluidized bed, each article to be coated is preheated and then suspended in the fluidized bed of coating material until a coating of a desired thickness is obtained. Then the article is removed from the bed and the heat contained initially is permitted to heat the coating material adhering to the outer surface, thereby forming a coalescent coating.

However, a difficulty has been encountered in coating articles having portions or areas of different heat capacity characteristics as, for example, a heavy article having radiating fins. This problem is acute where the heat capacity ratio is over 2:1, particularly so when this ratio is at least 4:1. In that instance, it has been found that after preheating the article to a temperature which would normally be sufficient to sinter the coating material, the heat in the smaller mass portions is dissipated at a greater rate than the heat in the portions having the larger mass, resulting in imperfect coating on the portions having the smaller mass. Conversely, when the temperature of the article is increased initially to a higher value, it has been found that at a temperature which would be sufficient to obtain a good coating on the portion having the smaller mass, the coating on the portion having the larger mass is damaged because of the high heat storage in the thicker sections of the article at the higher temperature. This damage to the coating at high temperatures can result either from the coating becoming too fluid causing run-off or sag, or from decomposition of the coating. With organic coating materials, the danger of decomposition is increased by the high temperature for an extended period of time. Applying a different initial temperature to the different portions in order to equalize the sensible heat stored in the two portions is difficult and expensive.

Accordingly, it is an object of the present invention to provide a process whereby a coating may be applied to an article having portions of different heat capacity characteristics.

A further object of the invention is to provide a process whereby articles having portions varying in thickness by a ratio of at least 2:1 may be coated in a uniform manner.

A still further object of the present invention is to provide a process for applying a uniform coating to all portions of an article of nonuniform mass.

Generally, the process of the invention provides for preheating an article, having sections of different heat capacity or thickness, to a temperature which will permit a frosting-like sintered but incompletely fused and substantially noncoherent coating to form on the thinner sections having the smaller heat capacity. At this temperature, the coating on the heavier section will be appreciably coalesced but will not be decomposed or otherwise defective due to exposure to an elevated temperature. The article, then, is immersed in a fluidized bed of pulverulent coating material, and upon removal, is preferably cooled and thereafter post-heated at an ambient temperature sufficient to completely coalesce the coating on all sections of the article, particularly the thin section. The function of the cooling step prior to post-heating is to remove the heat as rapidly as possible from the heavy section in order to minimize or prevent deterioration of the coating thereon.

Although the invention is not limited to any theory, it is believed that the success of the invention is due to an interrelation between heat storage capacity and time factors in the transfer of heat into and out of the article that is being coated. During the immersion, an excessive degree of coalescence of the coating on the heavy section is likely to occur because of the greater quantity of heat stored in that section which can be supplied to the surface to cause the coalescence of the coating, while in the thin section the quantity of heat stored is not sufficient to cause coalescence but the heat is dissipated. The results obtained therefore depend upon the time during which the heat stored in the two sections is capable of maintaining the proper temperature in those sections prior to cooling.

As the term is used in the description, a fluidized bed is a mass of solid particles which exhibits the liquid-like characteristics of mobility, hydrostatic pressure, and an observable upper free surface or boundary zone across which a marked change in concentration of particles occurs. Alternatively, the fluidized bed may be termed a "dense phase" having an upper free surface. These definitions are found in an article entitled "Fluidization Nomenclature and Symbols" appearing at pages 1249 and 1250 in "Industrial and Engineering Chemistry," volume 41, Number 6, June 1949. It is formed by introducing an ascending current of gas into the coating material under pressure, the bed being maintained in the fluidized state by controlling the flow of the gas. An article to be coated is heated and then immersed, at least partially, into the fluidized bed of the coating material. In order to produce the desired uniform coating, the article is preferably kept in motion during the immersion period. Individual particles of the coating material adhere and melt, thus fusing together with other particles on the hot surface of the immersed portion of the article to form a continuous coating thereon.

The protective coatings of the invention may consist of practically any material which has (1) a decomposition temperature reasonably higher than its melting temperature and (2) a sintering temperature lower then the decomposition or melting temperature of the material from which a particular article to be coated is made. Specific examples of such coating materials are polystyrenes, epoxy resins, porcelain, bitumen such as gilsonite or asphalt, shellac, silicone resins, glass and wax. Of course, various combinations of any of the above materials may also be employed for the production of coatings in accordance with the invention. Various filler materials may be added to any of the above coating materials for purposes such as to impart desired properties to the coating or to reduce the cost of the coating. Examples of suitable filling materials are powdered asbestos, slate, metal powders, heat stable powdered pigment materials, and polytetrafluoroethylene. Also, abrasive surfaced articles may be made by using abrasive fillers. The coating material is preferably in a pulverulent form in order that it may be fluidized readily in a fluidized bed.

Now, to present in greater detail a description of the process of the present invention, the article is preheated to a temperature at which the coating material will be sintered to and substantially coalesced on the heavier mass section without damage due to excessive heat. At this elevated temperature, the temperature of the section having the smaller mass will be just sufficient to provide a frosting-like coating, this temperature being insufficient to completely melt the coating material on the surface of this section of the article. Then the article is placed in the dense phase of a fluidized bed of fusible pulverulent coating material for a predetermined length of time depending, for example, upon the thickness of coating desired. Next, the article is removed from the fluidized bed and allowed to cool at least until the coating is sufficiently hardened to permit handling. To complete the process, the article is placed for a limited time in a suitable heating zone as, for example, an oven, at a temperature which will be just sufficient to completely coalesce the coating on the thin section (and to cure the coating in the case of thermosetting materials) without causing damage to the previously fused coating on the heavy section. This post-heating is effective to complete the coating because the heat applied to the coating material flows from the external or ambient atmosphere rather than from the article itself. After removing the article from the oven, it is allowed to cool to ambient room temperatures.

The dimensions of an article that determine the heat capacities of its various sections and thereby control the coating characteristics in the process of this invention are the thicknesses of such sections. That is, in the case of a finned tube the controlling dimension of the pipe itself would be the pipe thickness, whereas the controlling dimension of the fin would also be its smallest dimension, i.e., the thickness through the fin. If the ratio of the two thicknesses is at least 2:1, particularly if it is greater than 4:1, the tube forms a proper subject for coating by the process of the invention.

The specific values of preheat temperature are determined by trial and error for an article of a selected size, shape, thickness and heat capacity for the various sections to be coated. The upper limit of the temperature range would correspond either to the temperature at which the article would deform or at which the coating material on the larger section would be damaged, and the lower temperature would correspond to that necessary to sinter the coating material on the sections having the lesser mass or heat storage capacity. As previously stated, this process is uniquely adapted for use with articles having sections of relative mass ratios or relative heat capacities of at least 2:1.

To illustrate further the process of the invention, the following examples present particular illustrations of the process in coating specific articles:

Example I

A steel refrigerator rack having over-all dimensions of 6" by 14" with an outer frame formed of a bar 0.335" diameter and each intermediate cross bar 0.112" diameter was coated with a pulverulent plasticized white-pigmented cellulose acetate butyrate material having a particle size of less than 70 mesh. This article was preheated at a temperature of 525° F. for twenty minutes, and then immersed in the dense phase of the coating material for six seconds. Upon removal from the dense phase, the article was found to have a frosted, sintered but incompletely melted coating on the thin bars, and a substantially completely fused coating on the heavy bars. It was allowed to cool to almost room temperature. Then, the article was post-heated at a temperature of 475° F. for three minutes to fuse the frosted coating on the thin section.

Example II

A plating rack having outer dimensions of 12" by 12" with an outer frame and support bars of 0.305" diameters and cross bars and holding hooks of 0.120" diameters was coated with a polymerized epsilon caprolactam coating material having a particle size of less than 70 mesh. This article was preheated at a temperature of 675° F. for thirty minutes and then immersed for four to five seconds in the coating material. After removal from the coating material, the article had a frosty appearing incompletely fused layer on the thin sections and a substantially completely fused coating on the thick sections. It was allowed to cool to almost room temperature and then was post-heated at a temperature of 600° F. for one minute to completely coalesce the coating.

Example III

A steel balance ring of 19¾" outside diameter and 16½" inside diameter by 2.75" thick with a flange 0.085" thick extending 1" out from the outer diameter was coated with a blue-pigmented plasticized and stabilized polyvinyl chloride coating having a particle size of less than 70 mesh. The article was preheated at a temperature of 475° F. for one hour and then immersed in the coating for eight to ten seconds. After removal from the coating, the article had a "frosted" coating on the flange, and a substantially completely fused coating on the thicker sections. It was allowed to cool to almost room temperature and then was post-heated at a temperature of 500° F. for three to four minutes.

Example IV

A cast iron chair base having a general configuration resembling a large spool with an over-all height of 18" had top and bottom flanges of 6" outside diameter and 12" outside diameter, respectively. The length of the central portion of the chair base was approximately 10" of solid material, and the flanges at the top and bottom of the central portion being dished slightly to provide a variable thickness between ⅛" and ¼" over its surface. The outer diameter of the central portion was 1". This article was coated with a pulverulent plasticized white-pigmented cellulose acetate butyrate coating material having a particle size of less than 70 mesh. After preheating the article at 500° F. for thirty minutes, it was immersed in the coating material for eight to ten seconds. Upon removal from the coating material, the article had a "frosted" coating on the flanges, and a substantially completely fused coating on the thicker sections. It was allowed to cool until easily handled and then post-heated at 475° F. for five to seven minutes to complete the process.

Inasmuch as the process of the invention herein described is susceptible to many variations by one skilled in the art, all such variations are intended to be included within the scope of the invention.

I claim:

1. The process of coating an article having sections of different heat capacity in the ratio of at least 2 to 1, comprising heating the article, immersing the article while it is heated in the dense phase of a fluidized bed of pulverulent fusible coating material, the heating temperature being sufficient to maintain said section of lower heat capacity above the sintering temperature of the coating material but low enough that on subsequent withdrawal from the fluidized bed a powdery, incompletely fused layer of coating material is produced thereon, maintaining said article in said dense phase for a time sufficient to produce a coating on both of said sections, thereafter withdrawing the article from the fluidized bed, cooling all portions of the article to a temperature sufficiently below the melting point of the coating material to produce a hardened coating and thereafter heating said incompletely fused layer to a temperature above the melting point of the coating material.

2. The process described in claim 1 wherein the ratio of the heat capacities of two sections is at least 4 to 1.

3. The process described in claim 1 wherein said section of higher heat capacity is relatively thick and said section of low heat capacity is relatively thin and the ratio of thicknesses of such sections is at least 2 to 1.

4. The process described in claim 3 wherein the ratio of thicknesses of such sections is at least 4 to 1.

5. A process for coating an article in a fluidized bed of pulverulent fusible material in which said article is comprised of at least two sections that have different heat capacities varying in a ratio of at least 2 to 1, comprising the steps of heating said article and immersing it in said fluidized bed for a time sufficient to produce a coating on all said sections characterized in that said article is immersed in said fluidized bed while it is heated at least to that temperature at which said material will sinter on a section of low heat capacity, which temperature is below that temperature at which said material will fully fuse on a section of low heat capacity and below that temperature at which the coating on a section of high heat capacity will be impaired, said process further comprising the steps of cooling said article after removal from said fluidized bed until all portions of said article are sufficiently below the melting point of the coating material to produce a hardened surface coating thereon and, after said article is so cooled, heating said article sufficiently to complete fusion of the coating material thereon.

References Cited in the file of this patent

UNITED STATES PATENTS

| | | |
|---|---|---|
| 2,844,489 | Gemmer | July 22, 1958 |
| 2,930,106 | Wrotnowski | Mar. 29, 1960 |